(12) United States Patent
Okuno

(10) Patent No.: US 7,884,519 B2
(45) Date of Patent: Feb. 8, 2011

(54) GENERATOR CONSTITUTED TO GENERATE ELECTRIC POWER BY RING-SHAPED ROTATIONS

(76) Inventor: Iichi Okuno, 33-2, Kuramae, Suzui-cho, Iwakura-shi, Aichi 482-0035 (JP)

( * ) Notice: Subject to any disclaimer, the term of this patent is extended or adjusted under 35 U.S.C. 154(b) by 100 days.

(21) Appl. No.: 12/440,841

(22) PCT Filed: Sep. 11, 2006

(86) PCT No.: PCT/JP2006/318451

§ 371 (c)(1),
(2), (4) Date: Apr. 9, 2009

(87) PCT Pub. No.: WO2008/032410

PCT Pub. Date: Mar. 20, 2008

(65) Prior Publication Data

US 2009/0267439 A1    Oct. 29, 2009

(51) Int. Cl.
*H02K 37/00* (2006.01)
(52) U.S. Cl. .................. 310/156.38; 310/152
(58) Field of Classification Search ............. 310/12.12, 310/12.13, 156.38, 152
See application file for complete search history.

(56) References Cited

U.S. PATENT DOCUMENTS

| | | | | |
|---|---|---|---|---|
| 3,480,811 A * | 11/1969 | Grosbard | ............... | 310/156.38 |
| 3,496,871 A * | 2/1970 | Stengel | .................... | 417/410.1 |
| 3,665,227 A * | 5/1972 | Busch | ......................... | 310/46 |
| 4,214,178 A * | 7/1980 | Tippner | ....................... | 310/14 |
| 4,291,248 A * | 9/1981 | Rainbolt | ...................... | 310/14 |
| 4,381,181 A * | 4/1983 | Clegg | ....................... | 417/423.7 |
| 6,252,317 B1 * | 6/2001 | Scheffer et al. | ............... | 310/46 |
| 6,879,076 B2 * | 4/2005 | Long | ...................... | 310/156.38 |
| 6,936,937 B2 * | 8/2005 | Tu et al. | .................. | 310/12.12 |
| 2003/0173836 A1 | 9/2003 | Inagaki et al. | | |

FOREIGN PATENT DOCUMENTS

| | | |
|---|---|---|
| JP | 7-023547 A | 1/1995 |
| JP | 2003-244921 A | 8/2003 |
| JP | 2005-318708 A | 11/2005 |

OTHER PUBLICATIONS

International Search Report for PCT/JP2006/318451, dated Dec. 21, 2006.

* cited by examiner

*Primary Examiner*—Dang D Le
(74) *Attorney, Agent, or Firm*—Westerman, Hattori, Daniels & Adrian, LLP

(57) ABSTRACT

Provided is a generator in which straight rod magnets have been heated to form curved ones, with the identical polarity ends of the magnets having been forcibly butted together by diamagnetic connecting devices to form a field element ring. The field element ring is arranged through three Y-shaped sets (evenly spaced apart) of one inner and two outer roller devices set on a base steel sheet. Rotary drive force is applied from the centrally placed drive motor to one of the inner and outer roller devices to rotate the field element ring. Between, and in line with, the three sets of inner and outer roller devices are arranged three segments of an armature coil that is wound around the field element ring. In turn, the armature coil is encased within three segments of an armature core that are set on the base steel sheet.

8 Claims, 12 Drawing Sheets

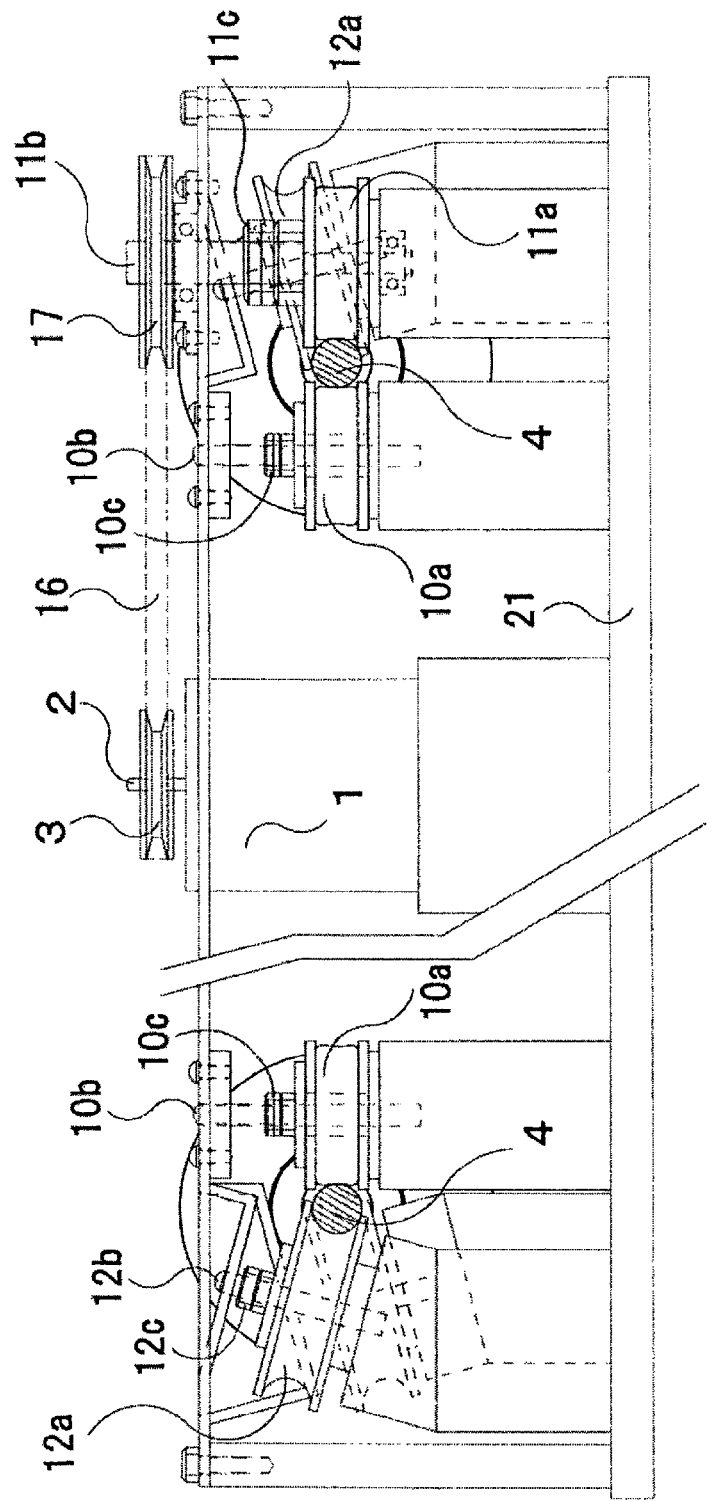

Accession of rod magnets and parabolic amount of magnetic flux density

| Value of X (mm) | One rod magnet (G) | Two rod magnets (G) |
|---|---|---|
| 100 | 71 | 74 |
| 90 | 96 | 102 |
| 80 | 133 | 144 |
| 70 | 190 | 201 |
| 60 | 275 | 304 |
| 50 | 403 | 425 |
| 40 | 615 | 648 |
| 30 | 931 | 990 |
| 20 | 1490 | 1578 |
| 15 | 1840 | 1965 |
| 12.5 | 2120 | 2220 |
| 10 | 2390 | 2420 |
| 8 | 2550 | 2640 |

Rod magnet

Diameter 23.5 (mm)

Length of axis direction 25 (mm)

Mass of rod magnet 80 (g)

Length of one rod magnet 25 (mm)

Length of two rod magnets 50 (mm)

GENERATOR CONSTITUTED TO GENERATE ELECTRIC POWER BY RING-SHAPED ROTATIONS

TECHNICAL FIELD

This invention relates to a generator made of straight rod magnets having been heated to form curved-shaped ones, with the ends of each of the magnets having been connected to one another by a diamagnetic devise to forcibly butt together the identical polarities of the magnets to form a field element ring. This ring is arranged so as to freely rotate through three Y-shaped sets of an inner and two outer roller devices, spaced evenly apart, between three segments of an armature core. To rotate the field element ring, rotary force is applied from the drive motor to one of the outer (and inner) roller devices. In line with the three Y-shaped sets of inner and outer roller devices, there is arranged in three segments an armature coil that is wound around the field element ring and both encased within the armature core. The field element ring rotates through the armature coil, which action generates a magnetic flux that emits into the armature coil, which in turn induces an electromotive force, based on Lenz' law, to be described, below.

$$e = N \cdot d\Phi/dt (V) \quad \text{Formula (1)}$$

N: Number of armature coil (turns) Φ: Passing magnetic flux [wb]

Forcibly butting rod magnets together at their identical polarities causes a magnetic flux to emit into the armature coil at about a right angle to the magnetic axis of the field element ring.

$$\text{Coulomb's law } F = m_1 m_2 / 4 \mu r^2 \, [N] \quad \text{Formula (2)}$$

$m_1$: Strength of the magnetic pole [magnetic loading]
$m_2$: Strength of the magnetic pole [magnetic loading]
$\mu$: Magnetic permeability of medium r: distance [m]

Identical polarities of magnets repel each other. If the space between them is eliminated, by forcibly butting them together, a magnetic flux is generated which, with increased density, will emit at about a right angle to the magnetic axis of the butted magnets. The purpose of this invention is to harness this phenomenon to efficiently generate electromotive force.

The ring geometry action of this field element ring of rod magnets causes the phenomenon in which a magnetic flux from the ring emits into the armature coil at about a right angle to the ring. This magnetic charge is inversely proportional to the square of the distance between the identical polarities of the magnets, with the damping effect of such a magnetic flux increasing. This phenomenon causes a generator to induce an electromotive force. The length of the armature coil is the same length as the field element ring, to vectorially neutralize the excited magnetized force, so that the butted identical polarities of the ring, alternately rotating through the armature coil, will generate electric power. This invention thus provides a generator that induces electromotive power by utilizing alternating magnetic flux. The amount of energy required to rotate the field element ring can be calculated by the following formula: The mass of the rod magnets, by the diameter of the rotating ring, by the speed of its rotation.

$$W = \frac{1}{2} \cdot J \omega^2 \quad \text{Formula (3)}$$

Although the mass of the field element ring is low, the magnetic flux emitting from the ring is high. This simple structure, using low drive power to generate a magnetic flux to emit into an armature coil at about a right angle to the field element ring, allows this inventive generator to produce more power than that of any other conventional generator. By forming within this structure a circularly-shaped armature coil and armature core, i.e. a power-generating structure, the least amount of magnetic flux is lost by the rotating field element ring while using a minimum amount of rotary drive power, so that a magnetic flux is efficiently generated to emit into the armature coil.

TECHNICAL BACKGROUND

In conventional generators, to obtain a higher density magnetic flux from a field element ring, an excited coil, wound the ring, must be provided to pass an electric current through the field element ring, so as to excite the core the ring. An electromagnetic type of field element ring can produce a higher density magnetic flux. However, to create an excited magnetic polarity within such a field element ring, it is necessary to increase the turns of the armature coil in order to increase the mass of the excited magnetic materials. If the mass of the field element ring is increased, the electric power necessary to excite the ring should be externally supplied. The field element ring emits a magnetic flux at about a right angle to the ring into the armature coil, thus generating electricity. However, it is first necessary to provide some external electric power to make it possible to excite the field element ring, to generate the magnetic flux. Since there are external factors involved, i.e. the driving force to rotate the field element ring, the electric current used to excite the ring, and the mass of the magnetic force causing excitation, it is first necessary to provide some external electric power. The less external electric power needed, the more efficient is the generator. In other words, the less flux lost, more efficiently is electricity generated.

Thus, the solution to the energy shortage is to reduce the amount of external energy needed to generate electricity. Research and experimentation are being conducted, today, to find such a solution.

Here are three published documents (Japanese publications of unexamined applications) regarding this invention.

Document 1: JP2006-14582, entitled, "Permanent-magnet Generator."

Document 2: JP2005-218183, entitled, "Rotating Electrical Machine and Electromagnetic Device."

Document 3: JP1980-79689, entitled, "Magnetic Power Generation."

General outline of the above documents are here described.

Document 1 shows a generator comprising a stator in which a three-phase wound coil is provided inside its stator yoke, together with a rotator made of a multiple, even number of permanent magnets whose identical polarities (S, S) and (N, N) repel each other. This generator is characterized in that the rotator rotates in the center of the stator so as to generate electricity. In reducing the electric burden to the generator, by efficiently utilizing the magnetic power of the permanent magnets, a net amount of electricity induced in the coil is realized.

Document 2 shows a rotary generator and an electrical motor (as a generator) having a structure to achieve a more efficient performance by increasing the magnetic flux generated in an aperture set between the rotator and the stator.

A rotator made of magnets is inserted. The magnet part of the rotator corresponds alternately to the identical (or opposite) polarity of the stator. At the same time, the backward swing of the rotating rotator corresponds to the position of the identical (or opposite) polarity. While rotating at the synchronous speed, the backward swing of the polarity of the rotator is always positioned relative to the polarity of the stator. Magnetic attracting force and repelling force are always generated by the polarity of the stator facing the forward and reverse swings of the polarity of the rotator, so that the force of rotation increases.

As mentioned above, this document describes an inventive generator that works very efficiently, with magnets being used to increase the magnetic flux at the aperture (air gap), as well as other elements, i.e., structure, dimensions, and the alignment of the iron core.

Document 3 refers to a magnetically electric generation device of a structure in which many outer magnets are openly and circularly aligned, with many inner magnets circularly aligned inside the outer magnets, so as to be rotatably engaged. The inner magnets are stably supported on a supporting plate having a central rotary shaft. A magneto coil, an electric generating magnet, and an iron core are orderly provided along the inner side of the rotary shaft. The circularly arranged inner magnets rotate in a certain direction by the repelling force generated between the inner and outer magnets and then, at that juncture, a rotary magnetic force is generated, which thus generates electricity in the magneto coil.

However, Documents 1, 2, and 3 do not describe a structure in which an armature core and an armature coil (stator) are aligned closely to a field element ring (rotator). Thus, magnetic flux may be lost, which is likely to pose a problem in achieving a magnetic flux from such a field element ring. Instead, Documents 1, 2, and 3 apply to a structure in which magnets are set face to face. Yet, only the magnetic flux emitted from the face-to-face magnets is addressed, without describing a structure which considers the relationship between the magnets and the coil. Also, Documents 1, 2, and 3 do not teach the necessity of exciting the structure, and the inventions described in those documents do not consider a structure in which a low mass produces a high magnetic flux of a high magnetic field, as this invention does.

In light of the above-referenced documents, it is possible to provide just such an efficient generator, as this invention does, as follows.

1. The field element ring is entirely made of permanent magnets, without having an excitation coil and an excitation core.
2. The direction of the emitted magnetic flux from the field element ring is changed.
3. The identical polarities of the rod magnets are forcible butted together with the spaces between them eliminated, to cause a magnetic flux to emit from between the magnets at about a right angle to the ring of magnets, i.e. Coulomb's Law is realized, which states: magnetic charges m1 and m2 of identical polarities repel each other. In eliminating the space between magnetic charges m1 and m2, the magnetic flux emitting from between m1 and m2 repel each other because they are of identical polarities, with the resultant magnetic flux thus bending to about a right (90 degree) angle to the field element ring. Thus, magnetic polarity m (Wb) is strengthened by eliminating the space between the identical polarities of the rod magnets.
4. The field element ring is made of rod magnets to minimize the size of the excited structure, so that even a ring of such low mass will produce a high magnetic flux of a high magnetic field.
5. An armature coil is wound around the field element ring, through which the ring rotates, according to Lenz' Law.
6. The field element ring rotates through the armature coil, both of which are encased within an armature core, cylindrically shaped.
7. The three Y-shaped sets of inner and outer roller devices are respectively set in three places, evenly spaced apart in line with the armature coil, to lend rotation to the field element ring. Rotary force to the ring is applied from the drive motor to one of the outer (and inner) roller devices.
8. As the field element ring rotates, a magnetic flux emits into the armature coil from between the butted ends of the rod magnets at about a right angle to the ring of magnets, thus inducing an electromotive force to generate electricity.
9. By forcibly butting together the rod magnets at their identical polarities, the magnetic axis of the ring of magnets is changed to about a right angle to the ring. Thus, a field element ring of low mass can produce a high magnetic flux, eventually reducing the amount of external energy needed to power the drive motor that applies ring geometry action to the field element ring, thus covering the loss of the initially used energy to generate the magnetic flux.
10. The power generated by this invention can be calculated by measuring the mass and velocity of the magnetic flux emitting into the armature coil, by the number of the turns of the armature coil, and by the number of polarities present (twice times the number of rod magnets used).
11. The capacity of the generator is the multiplication of the value of the electric current emitting into the armature coil.
12. In proportion of the mass and velocity of the magnetic flux to the mass of the field element ring, an increase in the velocity of the magnetic flux increases the speed of the rotating ring, as the magnetic flux emits into the armature coil, like an energy amplifier, thus causing an efficient generation of electricity.

DISCLOSURE OF THE INVENTION

Of this invention, the generator is a structure made of rod magnets formed into a field element ring to cause a magnetic flux to emit into an armature coil at about a right angle to the ring of magnets, which is achieved by the field element ring rotating within a narrow gap between the ring and the armature coil, both of which are encased in an armature core. By this structure, the magnetic flux generated by the field element ring emits into an armature coil, which thence flows to its opposite polarity within the field element ring. This circular motion of the magnetic flux repeats. With such a field element ring rotating within such a structure, the armature coil induces electromotive force to generate electricity.

The structure of the above generator is described, below.

1. The field element ring is formed of rod magnets circularly curved and joined together by a diamagnetic device, to forcibly butt together their identical polarities. Thus made, the ring geometry action of the field element ring generates a magnetic flux to emit into an armature coil at about a right angle to the magnetic axis of the ring of magnets, thus causing a magnetic flux to flow circularly throughout the structure to induce an electromotive force.
2. One of (the inner) and outer roller devices of one of the Y-shaped sets of roller devices, evenly spaced apart within the structure, externally provides rotational drive force to the field element ring, so as to rotate the ring.

3. An armature coil is wound around the field element ring, respectively, within each of the three segments of the armature core in line with the three Y-shaped sets of roller devices. Accordingly to the shape of the field element ring, an armature coil is wound around the ring, leaving a narrow gap between the ring and the cylindrically shaped armature core. The thickness and the number of the turns of the armature coil are determinedly based on where inside the armature core the armature coil is provided.

4. The cylindrically-shaped armature core, being halved, encases the armature coil at its outer circumference, with the armature core being slightly larger in radius than the armature coil. Within the cylindrically-shaped (fan-shaped) electromagnetic armature core, lies the armature coil, with a narrow gap between it and the armature core. A deformed sheet of thin steel is laminated onto each of the three segments of the armature core, with the shorter side of each sheet bent to an arch shape and the longer side of each sheet orthogonally turned. At the points where the arch-shaped, shorter side of the sheets are gathered, a space is formed in the central part of the sheets. A solid mixture of fine power of electromagnetic material and an adhesive agent is inserted into the formed spaces to make the armature core cover the armature coil. In other words, the halves of the arch-shaped thin steel sheets are orthogonally turned, with the halves of each formed upon but not touching the ring-shaped armature coil. Both the inner and outer sides of the three segments of the armature core are circularly formed, with each having a trumpet-shaped opening. The purpose of this opening is to reduce the pullback force of the excited field element ring as it is being drawn out of the armature core while it is rotating through the core.

5. The armature core is housed within a base steel sheet (receiving plate) to stop it from rotating excessively, while the sheet has been designed to let the field element ring rotate within the armature coil.

6. To prevent the field element ring from wobbling as it rotates, three sets of an inner and two outer roller devices are offset to one another so as to equally absorb and direct the centrifugal force of the rotating field element ring.

7. The electric current of the armature coil is resisted by electrical pressure due to the current being deflected at about 90 degrees to the ring of magnets (the field element ring). If the phase factor of the electric load changes, the electrical pressure of the induced electromotive force and the phase of the electric current will increase. To improve the phase lag of the armature coil, which is inductance ωL, connect a capacitor (condenser) of the same capacity to the armature coil, in parallel with the armature coil. For example, to improve the phase factor of the load circuit, connect the capacitor in parallel. With such a capacitor connected in parallel with the armature coil, the electric pressure of the induced electromotive force and the electric current stand in phase, so that a lopsided magnetic action is induced by the horizontal reaction (armature reaction). Thus, demagnetization can be improved by the distortion of the magnetic flux distributing throughout the coil.

This invention relates to a generator composed of the seven features described, above.

EFFECT OF THE INVENTION

Claim 1 of this invention refers to a generator comprising a field element ring made of permanent rod magnets incorporating circular cross-section to be heated and formed into a circular shape, connected by diamagnetic materials at each end of the magnets, the field element ring thus comprising a structure in which the identical polarities of the magnets are forcibly butted together, with the magnetic axis of the field element ring thus comprising a structure in which the magnetic flux induced by the identical polarities being butted together emits from between the identical polarities a magnetic flux bent at about a right angle to the magnetic axis of the ring of magnets, with the continuum of the magnetic flux along the butted indented ends of the magnets becoming an oval-shaped ring.

The field element ring receives the emitting magnetic flux, rotatably, within the three base steel sheet (receivers) through which the field element ring rotates, with each base steel sheet being secured at three points.

The armature coil is wound around the field element ring, with a slight clearance between it and the ring, both of which are encased the armature core.

The driving mechanism (drive motor) provides rotary force to one of the outer (and inner) roller devices to rotate the field element ring. The field element ring is rotated, and the magnetic flux generated at the field element ring is converted into the excitation magnetic flux, by this invention, electromotive force is induced the armature coil, generated by the ring geometry action of the field element ring.

Claim 2 in this invention refers to a generator comprising a mechanism to support the field element ring at three points.

Each set of the three Y-shaped supporting mechanisms comprises an inner roller device and two outer roller devices, through which the field element ring rotates, with the outer roller devices being set at a certain angle so as to receive and support the field element ring at three points, and so as to stabilize and lessen the resistance of the ring as it rotates.

The inner and outer roller devices that drive the field element ring are set at about a right angle to the surface of the ring, with the inner and outer roller devices being made of a (special) material that lets the circumference of the roller devices to expand, so as to exert pressure on the surface of the field element ring of Claim 1, to generate electricity.

Claim 3 in this invention describes a generator to generate electricity by the ring geometry action of a field element ring of Claim 1 comprising a structure in which halves of a cylindrically-shaped armature core encase the inner and outer circumferences of the armature coil, with the halved armature core being slightly larger in radius than the armature coil. Halves of a cylindrically-shaped insulator are set onto the armature coil, with some space and much fan-like electromagnetic material and a deformed fanned-shaped thin steel sheet provided thereon, with the shorter sides of the steel sheet being bent to an arch shape and laminated onto the armature core, with the longer sides of the steel sheet orthogonally turned.

Both ends of the inner side of the armature core has a circularly-shaped horn aperture. By way of example, the function of this aperture is to reduce the pullback force of the excited field element ring as it is being drawn out of the armature core while rotating. In other words, as the magnetic flux from the field element ring enters and exits the armature core, the armature core is excited, and this excitation force is vectorially balanced out and reduced.

Claim 4 describes a generator comprising a structure to generate electricity by the ring geometry action of a field element ring of Claim 1, in which the ring is set stably, vertically and horizontally, within an armature coil, with adjusting materials, to let the field element ring rotate through the center of a circularly-shaped tube, the armature coil.

Such a stable setting of the field element ring within the armature coil prevents the rotating ring to rub against the coil as the forward-backward directional amplitude of the ring geometry action of the ring shifts in phase due to the variation in the hard force rate of the armature coil, or from the amplitude of magnetization and demagnetization of the armature coil.

Claim 5 in this invention refers to a generator comprising a structure to generate electricity by the ring geometry action of a field element ring of Claim 1, in which a reaction by the load force rate of the armature coil is avoided.

To improve the phase, and to by keep a certain level of regular impedance and resistance of the armature coil, as well as the synchronous reactance of the armature coil, a parallel-connected capacitor of appropriate capacity is inserted into the circuit so as not to influence the capacity of the driving force of the field element ring, and so as not to fluctuate the generating capacity.

Claim 6 in this invention refers to a generator comprising a structure to generate electricity by the ring geometry action of a field element ring of Claim 1, in which a combination of an armature core, stored within a base steel sheet, and inner and outer roller devices are provided. The number of armature cores and inner and outer roller devices can be changed, accordingly, and their combination can be flexibly applied.

Claim 7 in this invention refers to a generator comprising a structure to generate electricity by the ring geometry action of a field element ring of Claim 1, in which a driving mechanism to rotate the field element ring is provided.

The driving mechanism comprises an electric motor in which an armature coil is wound around a field element ring, leaving a slight clearance thereon, with an electrical current being alternately applied to the armature coil, so that magnetic attracting and repelling is repeatedly created done, according to the polarity of the field element ring, as the electrical current is directly applied to the armature coil.

Claim 8 in this invention refers to a generator comprising a structure to generate electricity by the ring geometry action of a field element ring of Claim 1, with the ring as being the rotor of the electric motor, to apply an electrical current to the armature coil.

BRIEF DESCRIPTION OF DRAWINGS

FIG. 2 shows a cross-sectional view of FIG. 1, along lines A-A' and B-B', showing a structure in which the field element ring is supported and directed by the inner and outer roller devices.

FIGS. 3-1 to 3-6 are enlarged views of the armature core.
FIG. 3-1 is a cross-sectional view of the whole armature core.
FIG. 3-2 is a pattern view of the armature core, showing it during production, in which half of the core is seen twisted at about a right angle.
FIG. 3-3 is a side view of FIG. 3-2.
FIG. 3-4 is a flat view of FIG. 3-2.
FIG. 3-5 is a developmental front view of FIG. 3-2.
FIG. 3-6 is a developmental front view of the armature core, shown in production phase, the other half of the armature core seen twisted at about a right angle.

FIG. 4 is a cross-sectional view of the armature core, of the armature coil, of the field element ring in line with the inner and outer roller devices.

FIG. 5 is a cross-sectional view of the armature core, encasing the armature coil and the field element ring in line with the inner and outer roller devices.

FIG. 6 is a cross-sectional view of the three sections of the adjusting devices used for adjusting and positioning the armature casing which encases the armature core, the armature coil, and the field element ring (removably set on the base steel sheet).

FIG. 8-1 is a cross-sectional view of the connecting devices used to connect the rod magnets of the field element ring.

FIG. 8-2 is an exploding view of FIG. 8-1, showing the diamagnetic device used to connect the magnets together.

PREFERRED EMBODIMENTS OF THIS INVENTION

Figure 1:
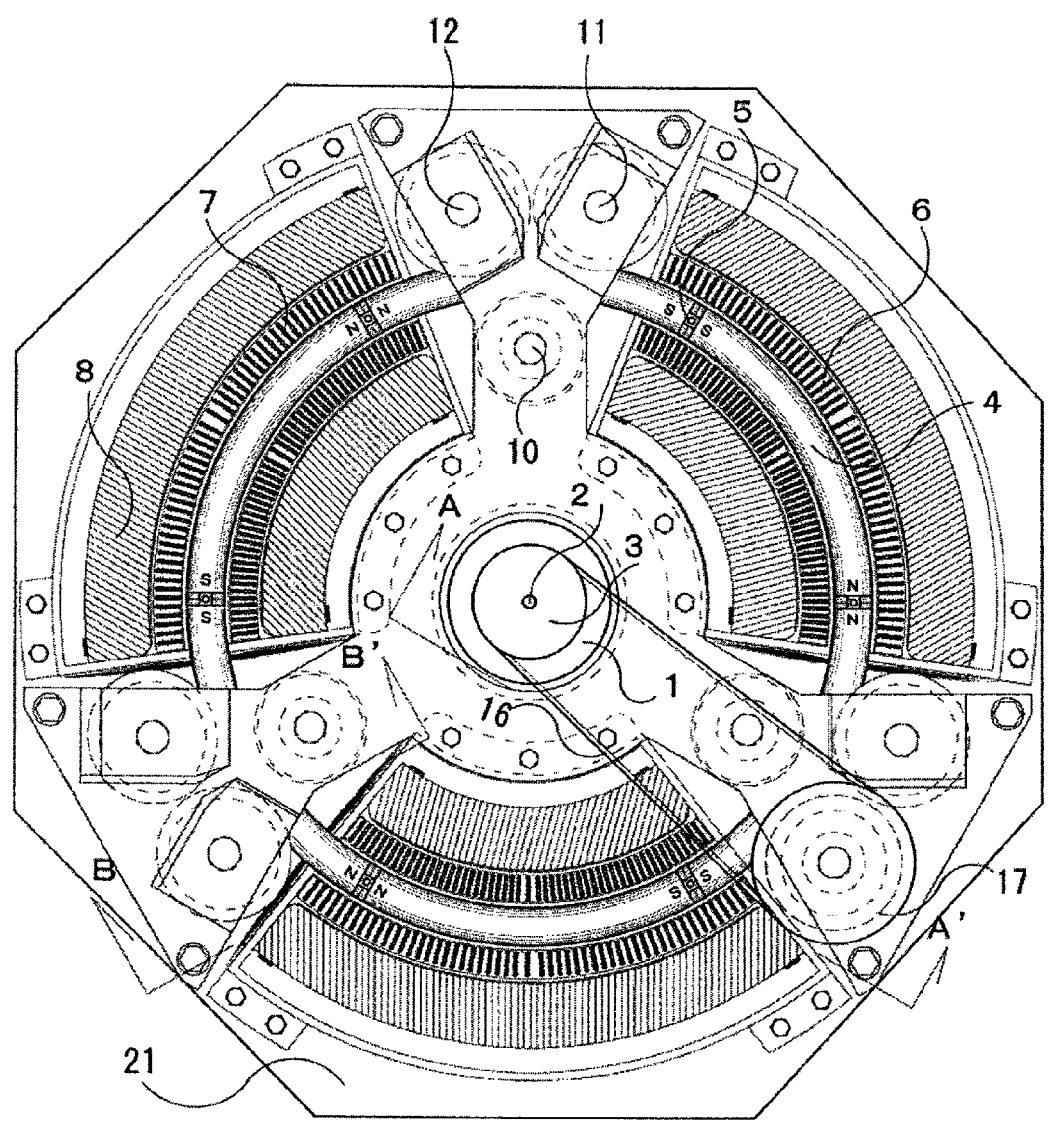
FIG. 1 is a cutaway view of the overall structure of this invention, showing in frame format, the internal structures of the armature core and armature coil. A field element ring, made originally of rod magnets, rotates through the armature core. The field element ring is supported by three Y-shaped sets of inner and outer roller devices, spaced evenly apart. The armature coil and armature core are set in line with the three sets of inner and outer roller devices and are covered by an adjusting device for mounting and positioning the armature core. Rotary drive force is applied to one of the outer (and inner) roller devices, so as to rotate the field element ring, to cause a magnetic flux to emit into the armature coil at about a right angle to the ring of magnets (the field element ring) to induce an electromotive force, thereby generating electricity.

Referring to the drawings, the embodiments of this invention are described, here.

Figures 1, 3:
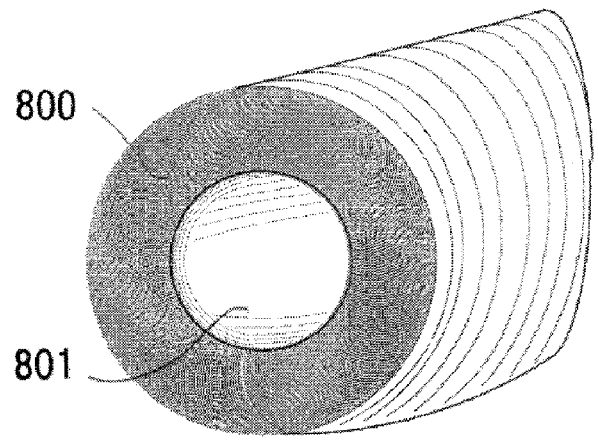
Figures 2, 3:
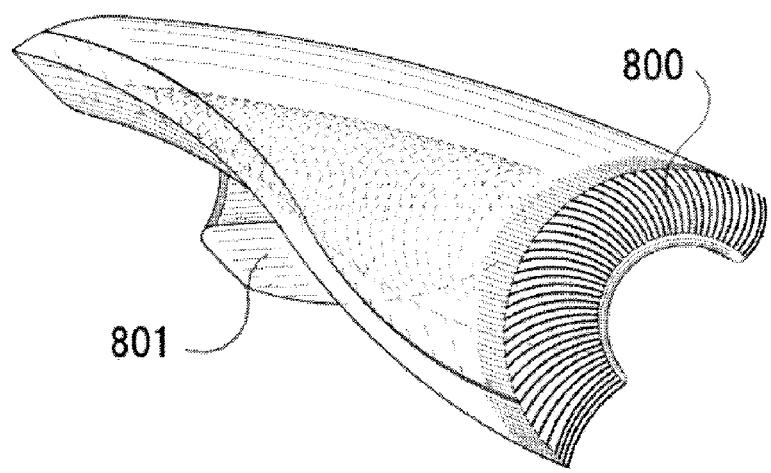
Figure 3:
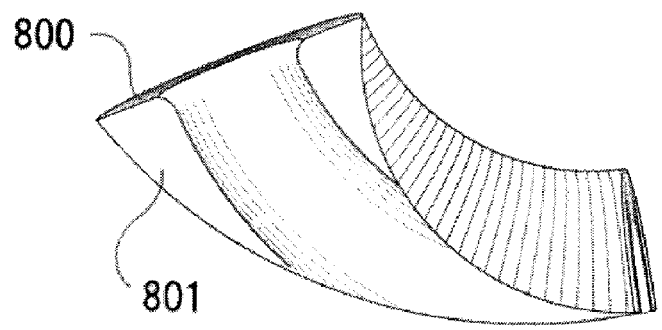
Figures 3, 4:
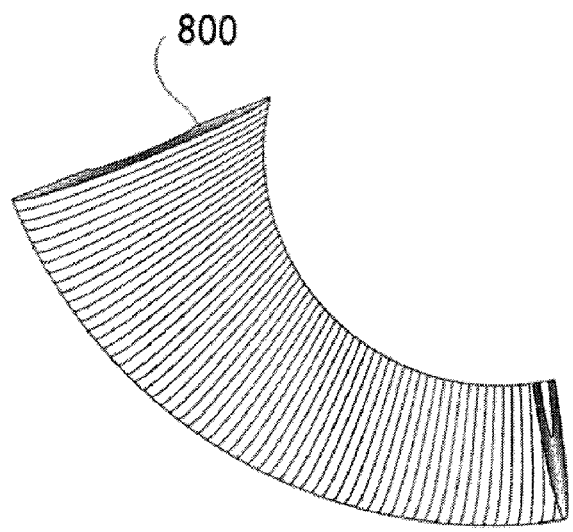
Figures 3, 4, 5:
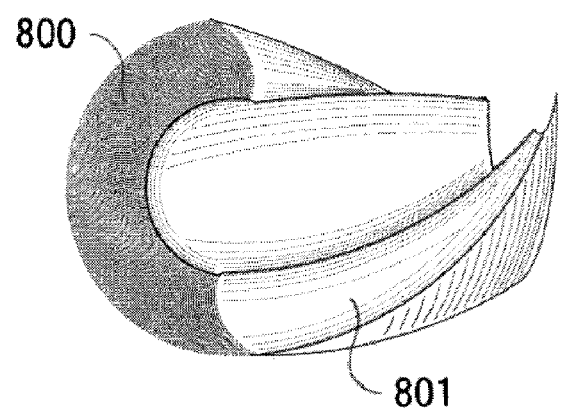
Figures 3, 4, 5, 6:
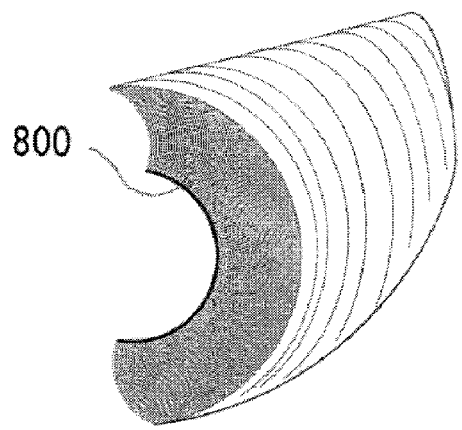
Figure 4:
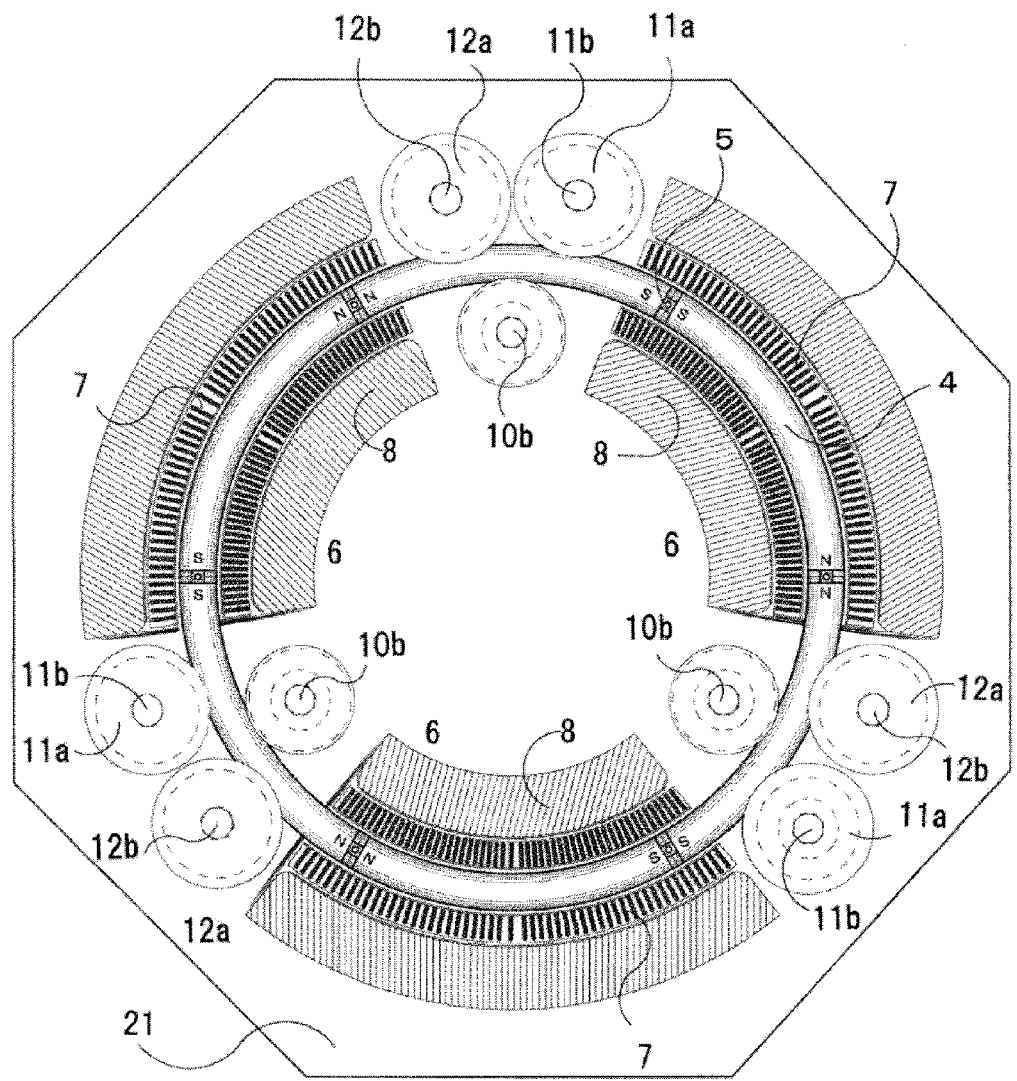
Figure 5:
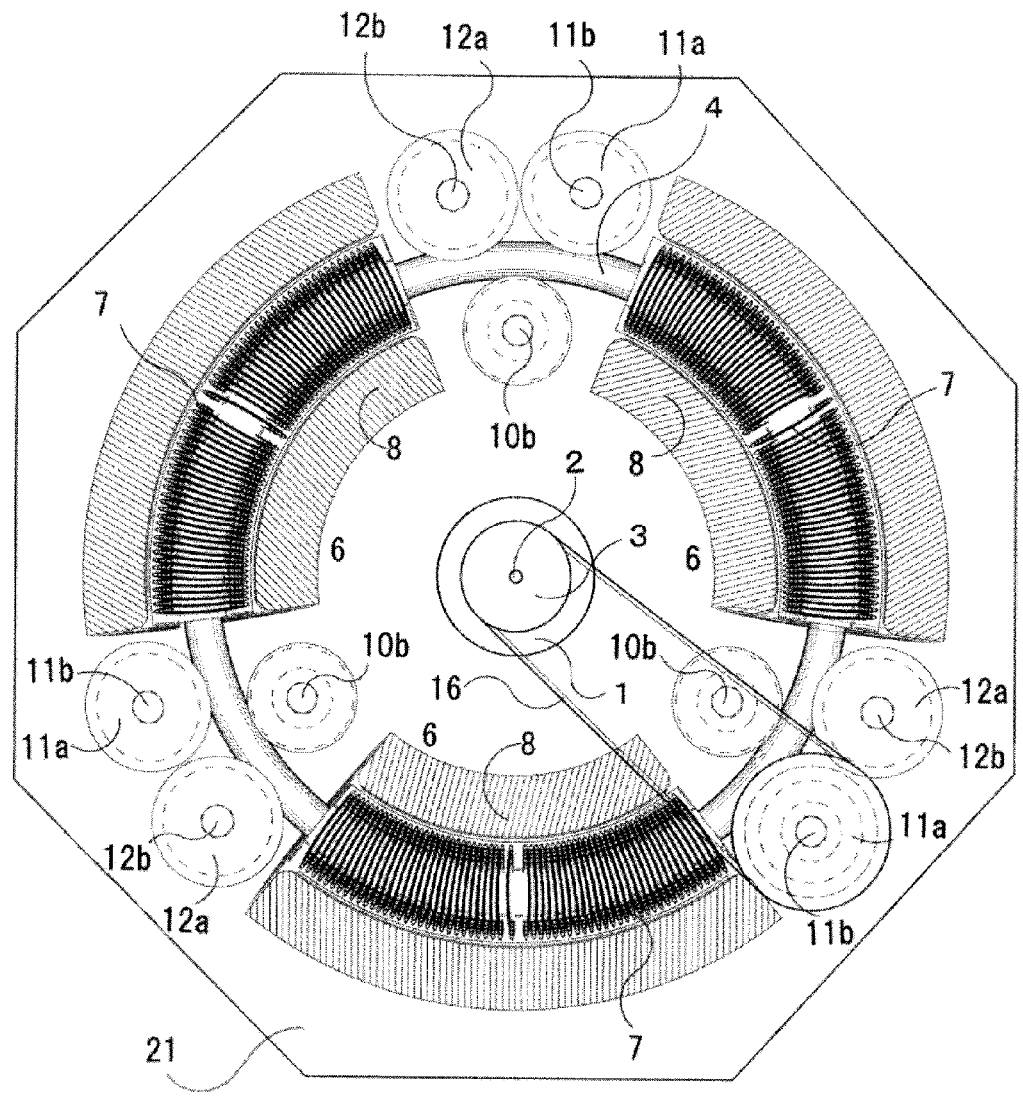
Figure 6:
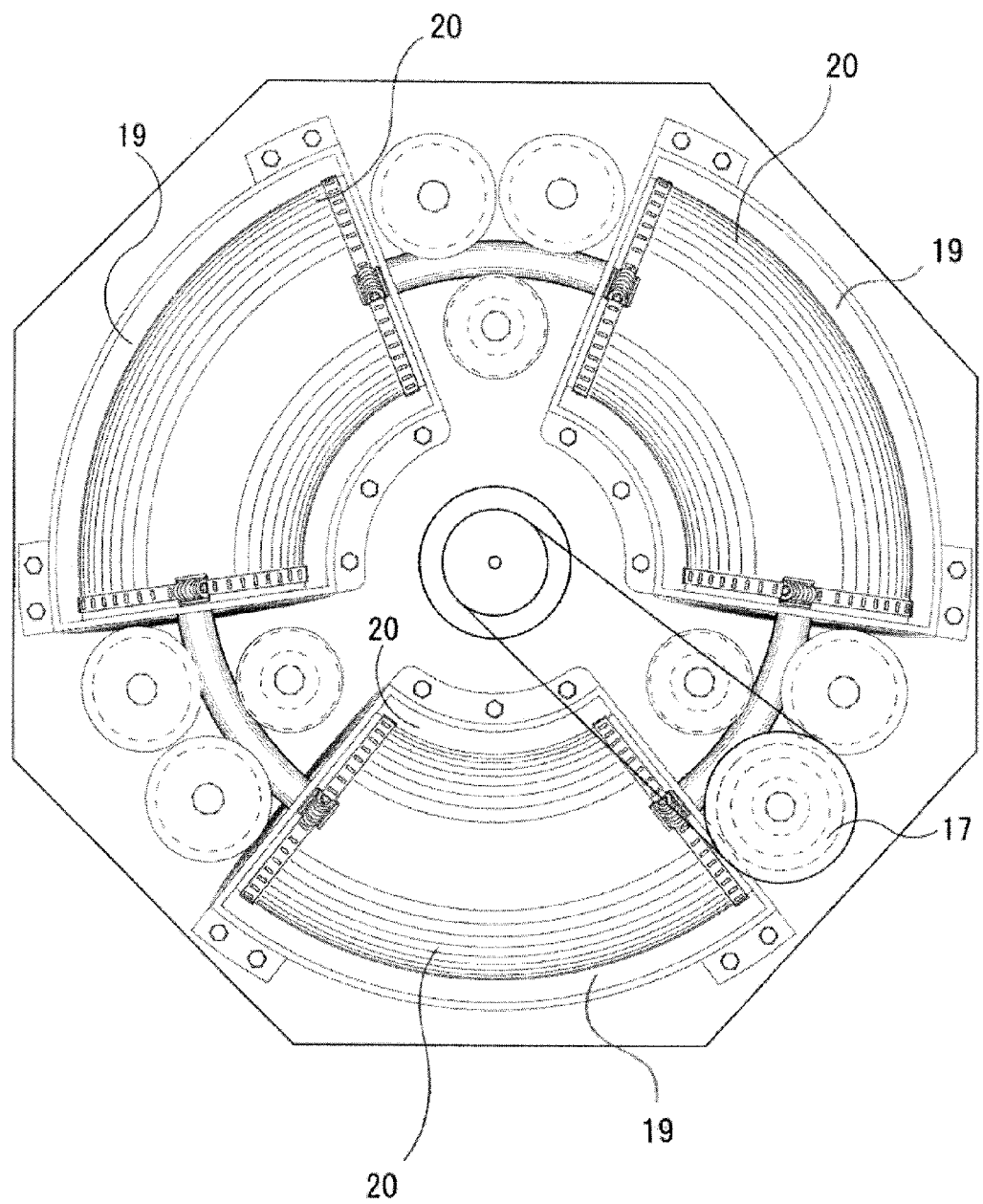
Figure 7:
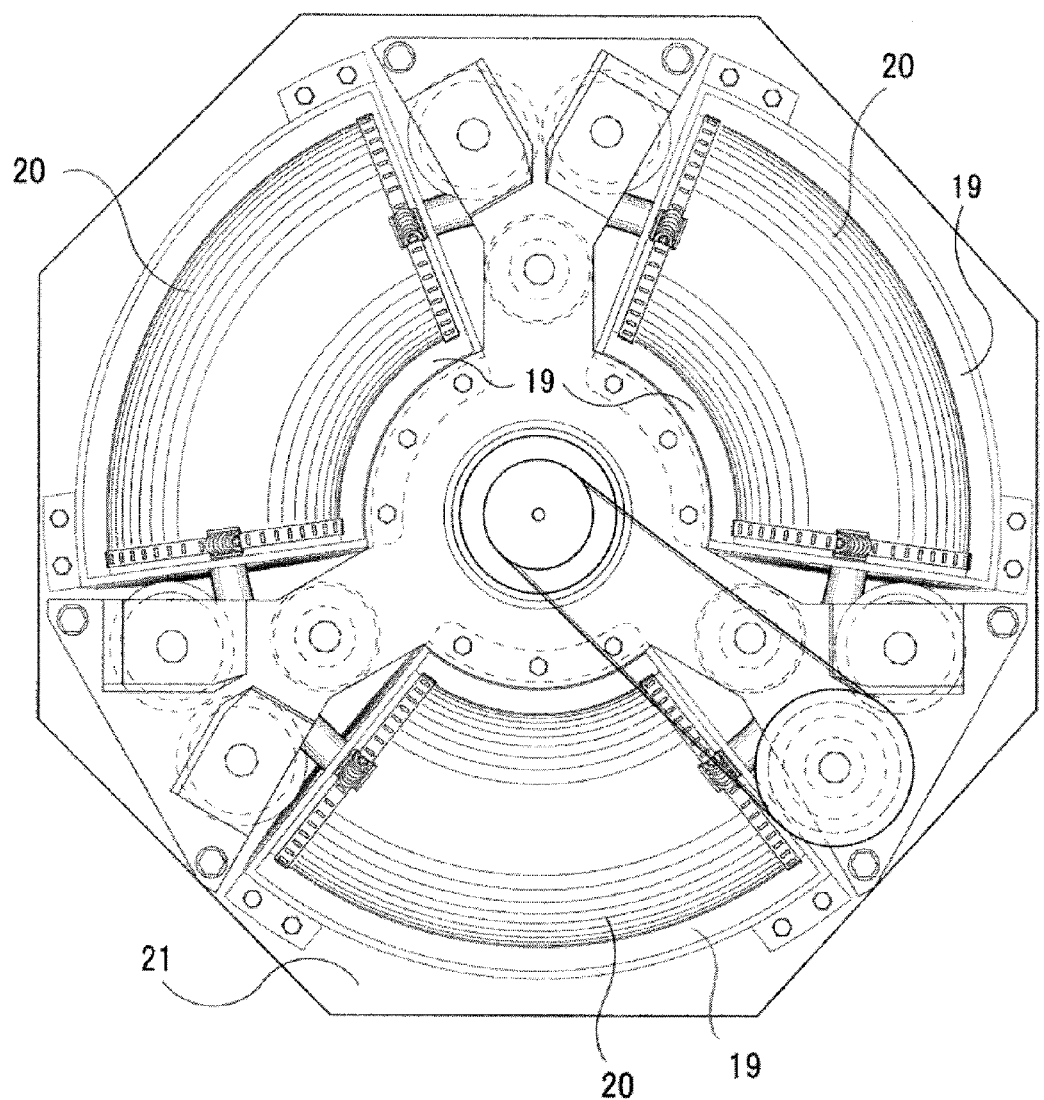
FIG. 7 amplifies FIG. 6, showing the supporting materials for the field element ring.
Figures 1, 8:
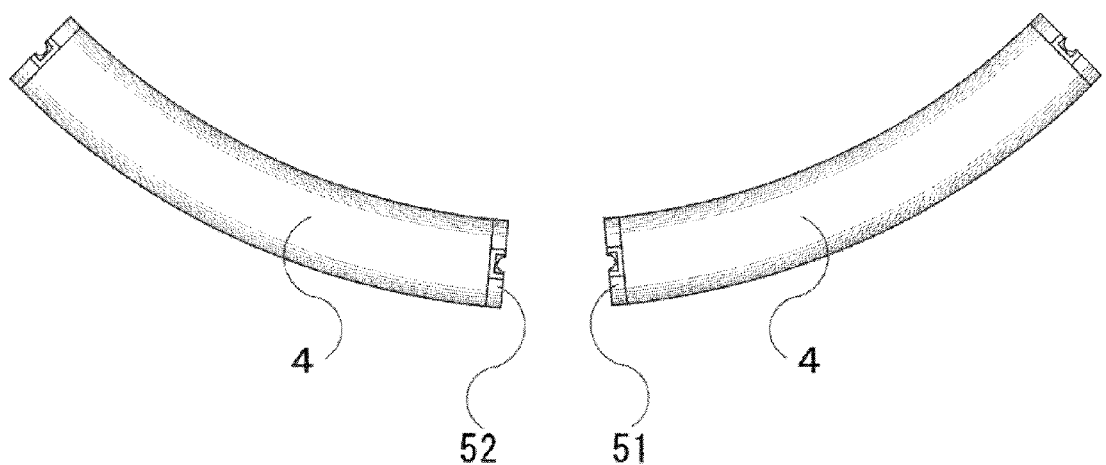
Figures 2, 8:
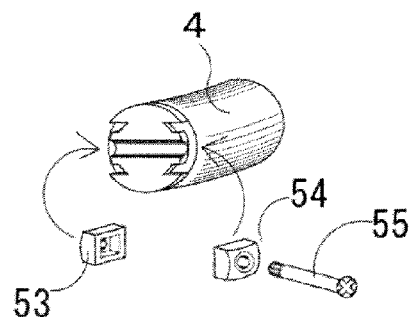

In FIG. 1 shows the overall structure of this invention. The electric drive motor 1 is centered on the base steel sheet (receiver) 21. The field element ring 4, rotated by the electric drive motor 1, is provided above the receiver 21, set within inner roller device 10 (receiving roller device) and outer roller devices 11 and 12 (receiving roller devices). The field element ring 4 is of a structure in which rod magnets (of straight permanent magnets) are formed curved shaped. The drive shaft 2 of the electric motor 1 is shown in FIG. 1. The connecting device 51/52 (FIG. 8-1) of diamagnetic materials is attached to the ends of the rod magnets to butt together the identical polarities of the magnets with the connecting nut 53, and the connecting seat 54, and the connecting bolt 55 (FIG. 8-2), thus forming the curved-shaped magnets into a ring.

The field element ring 4, as structured, above is positioned above the base steel sheet 21, within the inner roller device 10 and the outer roller devices 11 and 12. The inner roller device 10 comprises an inner roller 10*a* and supporting bolt axis 10*b*. The outer roller devices 11 and 12 comprise an outer roller 11*a* and 12*a*, respectively, and supporting bolt axes 11*b* and 12*b*, respectively, to support outer rollers 11*a* and 11*b*. The inner roller device 10 and the outer roller devices 11 and 12 are held in place by supporting bolts 10c, 11c, and 12c, respectively. Each of the three sets of the inner roller devices 10 and the outer roller devices 11 and 12 are provided, thusly, and secured to the base steel sheet (receiver) 21. The supporting bolt axis 11b of outer roller 11a is extended to support V-belt pulley 17 for turning the roller thereon. The V-belt pulley 3, provided on the electric drive motor 1 is connected to the V-belt pulley 17 by the V-belt 16, thus rotating the supporting bolt axis 11b of the outer roller 11a through its pulling action by means of the V-belt pulley 16, driven by the ring geometry action of the drive motor 1.

The armature coil 7 is tightly wound around the field element ring 4 so as reduce as much as possible the loss of magnetic flux. The field element ring 4 and the armature coil 7, together with the armature core 8, are tightly enclosed within a base 19 and an adjusting device for mounting and positioning the armature casing 20, so as to prevent the loss of magnetic flux. The field element ring 4 is set within the armature coil 7, the armature core 8, and the adjusting device for mounting and positioning the armature casing 20. The base 19 is removably provided on the base steel sheet 21.

FIGS. 3-1 to 3-6 are partial diagrams showing half sections of the armature core. To make a half section of the steel tube 800, it is cut into a fan shape and both inner sides are circularized. One end of the halved steel tube 800 is bow shaped. The other end is stretched and twisted at a right angle to form the steel sheet 801, to become the cylindrically-shaped armature core 800. An electromagnetic fine powder (not shown) is applied to the surface of the steel sheet 801 to connect it to an adhesive agent (not shown).

Figure 9:
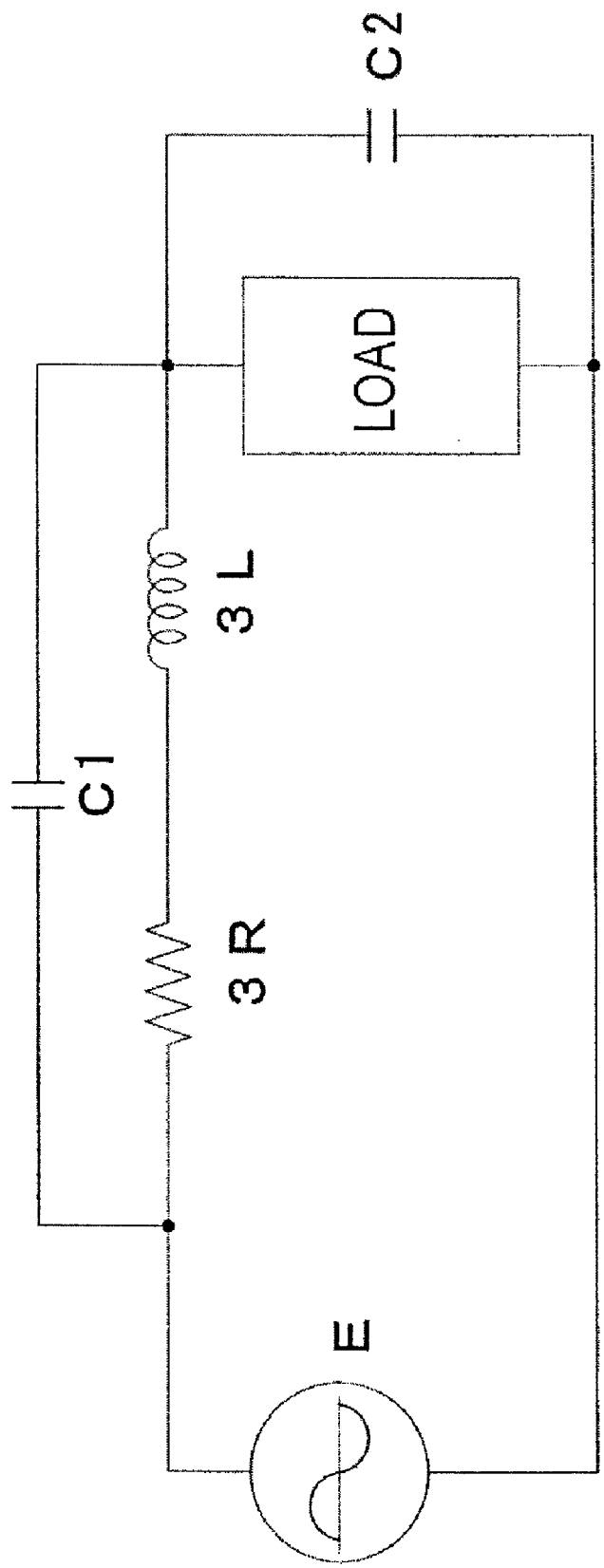
FIG. 9 is an electrical diagram of the generator.

FIG. 9 is an electrical diagram of the generator. The actual value of the induced electromotive force E is generated and then connected to the coil resistance R of the armature coil 7, and the inductance L of the armature coil 7 and the three segments of the armature core 6 are connected. A capacitor C1 is connected in parallel to the entire armature coil 7 to improve the reaction of the armature coil 7. To improve the phase factor cos θ, incurred by the transmission of the load power, a capacitor C2 is connected in parallel.

Figure 10:
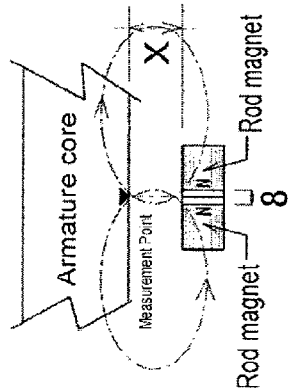
FIG. 10 is a chart showing the parabolic density of the magnetic flux measured when the identical polarities of the permanent rod magnets are butted together.

As shown in FIG. 10, when rod magnets are forcibly butted together, a magnetic flux emits from between them in the form of two oval shapes which lack a vertex, and which can be measured. The offset point X is measured at a distance from the position between the butted ends of the rod magnets. Where the armature coil 7 is wound at point X, point X can be substituted for calculating the magnetic flux of the armature coil 7 to determine the electrical pressure (voltage) of the magnetically induced electromotive force.

Figure 11:
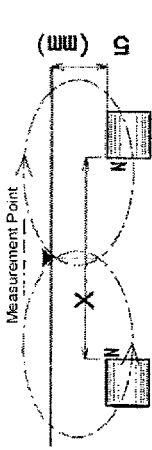
FIG. 11 is a chart showing the parabolic density of the magnetic flux measured as the identical polarities of the permanent rod magnets are being butted together.

As shown in FIG. 11, when the identical polarities of the rod magnets are forcibly butted together, an amount of power is generated, which is inversely proportional to the square of the distance between the polarities, according to Fleming's law. The power emits at a right angle to the magnetic axis of the line of magnets, and eventually the magnetic density B (G) apparently increases, which can be proven by measuring the value of the magnetic density at its point B (G) between the two oval-shaped loops of the magnetic flux.

The above main subject of this invention is described hereto, and it is be shown by the use of the in-and-out energy relational expression that electricity is generated. When the identical polarities of the rod magnets are forcibly butted together, the following formula is suggested, based on Coulomb's law.

Coulomb's law $F = m_1 \cdot m_2 / (4 \mu r^2)(N)$

The relational expression of the repelling force F and the distance X is shown by the energy formula W, below.

$XF = W = BHV/2 = B^2 V/2\mu$      Formula (4)

μ: Magnetic permeability of air in the air gap [H/m] W: Magnetic energy

B: Magnetic density [T] H: Intensity of magnetic field [A/m]

V: Volume of air gap [m$^3$]

When r is varied, repelling force F of the identical polarities increases, since the space between them is eliminated. Repelling force F appears as an increased amount of magnetic density B (G), and the looping magnetic flux emits to a short distance, thus by such "leakage" drastically decreasing the amount of energy. If the rod magnets were butted together at their opposite polarities to form a field element ring, no magnetic flux would emit from between them. Contrarily, when the rod magnets are butted together at their identical polarities, a magnetic flux emits from between them into the armature coil 7. With the space between the identical polarities eliminated, the magnetic density B (G) increases, and the magnetic flux B (G) will flow in a path of two looping spheres (oval shaped) and intersecting at point B (G). Thus, if an armature core were not used as a covering, the magnetic density would loop and flow and eventually form a different path of magnetic flux, between the inner and outer side of the loops, and the intense magnetic flux emitting from the field element ring 4 would change. This means that even one turn of the armature coil 7 generates electric pressure. The magnetic flux emitted from the field element ring 4 forms oval shaped magnetic polarities which spirals throughout the armature coil 7. Thereon, the armature core 8 makes for an ideal structure, in that the oval-shaped looping spheres of the magnetic flux are deformed and connected at about a right angle to the armature coil 7.

Differences in the magnetic density, between the magnetic connections, are observed when either diamagnetic or electromagnetic material is provided between the identical polarities. In other words, using either diamagnetic or electromagnetic material can cause a higher magnetic density. The reason being is that when such material is used, it will cause a magnetic circuit in which the magnetic flux emitting from between the identical polarities of the magnets fully collide and vanish, thus decreasing the density of the magnetic flux.

The field element ring 4 is rotated by the turning action of inner roller devices 10 and the outer roller devices 11 and 12. Rotary driving force for the field element ring 4 is externally provided to turn the inner 10 and the outer 11 and 12 roller devices. The magnetic flux from between the permanent magnets emits into and interacts with the armature coil 7 to induce an electromotive force within the armature coil 7. As described above, the magnetic flux emitted from the field element ring 4 forms interlinking oval shapes that flow through the armature coil and is absorbed by the armature core 8, thence flowing back into and through the armature coil 7 to return to the field element ring 4. The rotating action of the field element ring 4 causes this circular flowing of the magnetic flux throughout the whole of the armature coil 7.

The strength of the magnetic charge m (Wb) is inversely proportional to r$^2$ of the distance between the identical polarities. When the magnetic flux B (G) interacts with the armature coil 7, the density of the magnetic flux B (G) decreases moderately. This phenomenon shows that although the emitting magnetic flux density B (G) increases, the dropping rate in voltage to the load fluctuation decreases.

This phenomenon is shown in a formula as the value of the magnetic flux in the magnetically-induced electromotive force, concerning the output electric pressure of the generator.

Magnetically-induced electromotive force $E=1.11\,\text{Pa}\,NZ\Phi$     Formula (5)

Form factor: 1.11 Pa: Number of polarities

N: Number of rotations of the field element ring (sec)

Z: Number of armature coils (turns) Φ: Magnetic flux (Wb)

Output power capacity $P=EI$     Formula (6)

Magnetically-induced electromotive force E is multiplied by the current value I (A)

The capacity value to rotate the field element ring 4 is obtained by calculating the mass of the rod magnets. The capacity of output power P can be calculated by the formula $W_1 = \tfrac{1}{2}\cdot J\omega^2$. When the field element ring 4 is rotated, the following formula 7 is used to express the loss in friction in relation to the inner and outer roller devices 10, 11, and 12.

Friction loss $W_2 = 9.8\,\mu pSv$     Formula (7)

μ: Friction coefficient p: Pressure between the field element ring and the inner and outer roller devices (kg/m$^2$)

S: Contact area between the inner and outer roller devices and the field element ring (m$^2$)

V: Peripheral speed of the field element ring (m/S)

Based on the formula expressing the of magnetic density B (G) according to the condition of the eddy-current loss and the hysteretic loss and frequency, such loss is proportional to the weight of yoke. Iron (excitation) loss Wi can be calculated as shown, below.

Iron loss $Wi = G \cdot Wfc(W)$     Formula (8)

G=Weight (kg) W f c: Yoke loss (W/kg)

Armature copper loss $Wc = I^2 R(W)$     Formula (9)

The input-output ratio of the generator can be obtained by substituting the value of Formula (9).

The capacity of the generator can be calculated by the formula below.

$W = \text{output}/\text{Input} = P/(W_1 + W_2 + Wi + Wc)$     Formula (10)

Between the field element ring 4 and the armature core 8, high-powered excitation is provided at the entrances of the three segments of the armature core 8, as the field element ring 4 rotating. To resolve the hindrance of the rotating action of the field element ring 4, the entrances of the armature core 8 are formed in the shape of trumpet, and the vector angle to the magnetic axis, which is excited by the polarity of the field element ring 4 is enlarged, thus minimizing the hindrance of the field element ring 4 to rotate freely. If the distance between the polarities of the field element ring 4 is set almost as the same distance between it and the armature core 8, the polarity of the field element ring 4 is determined at nearly the same position at the edge of the armature core 8, and the amount of power used to excite the armature core 8 is the same. This phenomena equalizes the rotary power of the field element ring 4 in both directions, forward and backward rotations, so that external hindrance of the rotating action of field element ring 4 is reduced to almost zero. Thus, it is unnecessary to consider any loss of magnetism, and so any loss of energy can be eliminated from the equation of the input-output formula. The magnetic flux causes intensive excitation as the field element ring 4 rotates through the armature core. Yet, there is no loss of magnetic flux, since the amount of power of such intensive excitation is the same in all directions and at an equal distance, circularly. Thus, there is no hindrance to the rotating action of the field element ring 4, and thus no loss of excitation of the armature core 8. The performance of this invention as a generator is determined by the relation between the mass of the field element ring 4 and the mass of the magnetic flux emitted from the. To obtain the value of the electric pressure under no-load saturation, it is necessary to measure the saturated voltage under no-load saturation, adjusting the rotary speed of the field element ring 4, since the electricity there from is generated by the magnetic flux from the field element ring 4, not by the electromagnetic force that is induced by the excitation current. As a result, the value of the saturated voltage of this generator is larger than that of a conventional synchronous generator. The armature coil 7 is shunted, and the short-circuit current is also different from conventional mode in checking the ratio of the magnetic flux and the current through the armature coil 7 by the passing excitation current. As the field element ring 4 rotates is rotating, the excited magnetic flux of the field element ring 4 has changed, the short-circuit current becomes larger in proportion to the rotary speed, and the angle of this ratio shows a more ascending curve than the conventional short-circuit curve. As such, excitation is achieved by applying the current to the polarities, and the phenomenon shown by the ratio of the magnetic flux in variation is considered as a variation of the magnetic flux emitted from the field element ring 4 of this invention. Thus, the loss of excitation which used to be necessary for transduction in conventional synchronous generators can be reduced, letting the short-circuit ratio K to increase. Therefore, the depression of the load voltage is improved in this generator, compared to that found in a conventional generator.

In a conventional synchronous generator, the number of rotations of the field element ring 4 is constantly maintained. However, in this inventive generator, the number rotations of the field element ring 4 fluctuates, since the magnetic flux emitted from the field element ring 4 remains constant. The performance of the field element ring 4 of this inventive generator (in which identical polarities of magnets are forcibly butted together to emit a magnetic flux), and the structure of the cylindrical-shaped armature core, essentially enhances the efficiency of this generator. Thus, this inventive generator comprises the best structure to realize the best result.

DESCRIPTION OF REFERENCE NUMBERS

1. Drive motor
2. Drive shaft
3. V (-belt) pulley
4. Field element ring
5. Connecting material (device)
51. Connecting material (device) I
52. Connecting material (device) II
53. Connecting nut
54. Connecting seat
55. Tightening bolt
6. Armature
7. Armature coil
8. Armature core
800. Laminated steel sheet
801. Laminated steel sheet
10. Inner roller device
10a. Inner roller
10b. Supporting bolt axis
10c. Supporting bolt
11. Outer roller device
11a. Outer roller
11b. Supporting bolt axis
11c. Supporting bolt 12. Supporting bolt axis
12a. Outer roller
12b. Supporting bolt axis
12c. Supporting bolt
16. V-belt
17. V-belt pulley (of the outer roller device)
19. Base plate
20. Adjusting material (device) for mounting and positioning the armature core (casing)
21. Base sheet steel tray
C1. Condenser
C2. Condenser
E. Magnetic induced electromotive force L. Inductance R. Coil resistance

INDUSTRIAL APPLICABILITY

As described above, this invention provides a generator comprising a rotary structure (a field element ring) in which the identical polarities of rod magnets are forcibly butted together to increase the density of a magnetic flux, for example, a magnetically-induced electromotive force is generated by a magnetic flux that emits into an armature coil. This invention adapts a method by which electricity is generated by a field element ring rotating under conventional energy conversion. In other words, this invention does not adapt a method to generate electricity by injecting and exploding fuel, such as petroleum or the like. Therefore, this invention can provide benefits, practicality, or the like and avoids hazardous explosions, or the like and a complex structure. Also, this invention will not cause the polluting of oceans, since fuel such as petroleum or the like is not used and thus will not spill into the oceans. Furthermore, there is no chance that harmful radiation will be emitted.

This invention has a structure in which energy stored in a battery is used to drive and activate the device, and that electricity generated by the generator is returned from the load side to the battery to charge the battery, so as to continue operation. Therefore, this invention resolves the disadvantage of a mechanism in which a generator using only permanent magnets cannot secure generating capacity. Also, the whole mechanism of this invention can be reduced in size and thus be efficiently utilized. This invention makes it possible to provide many units of small generators to respond to the greater demand for electricity. Also, to deal with peak load, or to respond to other specific demands, the rated value of electricity is specified within the possible maximum range of the rotary speed of the field element ring. Furthermore, the cost for the parts of this inventive device can be reduced, and they can be purchased at a low price, thus enabling the electrical industry to provide practical, low-cost generators.

This invention has good economic potential, practical utility, and significant benefit, and can be utilized as a source of power for industrial machinery, thus leading the electrical industry to a cutting-edge status. For example, this invention can be applied to automobile engines, generators for ships and vessels, as well as to industrial machinery. The greatest good of this invention is that it will provide generators for electrical power plants that will result in the production of more energy at a reduced cost, which will benefit everyone.

What is claimed is:

1. A generator to generate electricity ring geometry action of a field element ring made of permanent rod magnets incorporating circular cross-section to be heated and formed into a circular shape, connected by diamagnetic devices at the ends of the magnets, and characterized by comprising a structure in which the identical polarities of the rod magnets are forcibly butted together, with the magnetic flux of the identical polarities emitting at about a right angle to the magnetic axis of the field element ring, as a continuum of an oval-shaped magnetic flux with a centered point between two looping rings, therein, with the field element ring receiving and supporting the emitted magnetic flux rotatably received in a base steel sheet (receiver) supporting the rotary mechanism at three points, with an armature coil wound around the field element ring, leaving a slight clearance, both of which are encased by an armature core, and as a drive mechanism, a drive force is provided to one of the rotation mechanisms, so as to rotate the field element ring wherein the magnetic flux generated at the field element ring is converted into the excitation magnetic flux to generate a magnetically-induced electromotive force at the armature coil.

2. A generator to generate electricity by the ring geometry action of a field element ring of claim 1 which is received and supported by supporting devices (mechanisms) to support the field element ring at three points, characterized by comprising structures in which one set of the supporting devices (mechanism) incorporates a combination of one inner roller device and two outer roller devices, respectively, on the inside and outside of the field element ring, with the outer roller devices being set at a certain angle so as to receive and support the field element ring, and the inner and outer roller devices having a structure to receive and support the field ring at three points, considering the stability of rotation, friction resistance, or the like, of the field ring, with the driving part of the inner and outer roller devices having a structure to provide pressure at approximately a right angle to the surface of the field element ring, and with the inner and outer roller devices having a (special) material structure to expand the circumference of the roller devices so that pressure is provided to the surface of the field element ring to generate electricity.

3. A generator to generate electricity by the ring geometry action of a field element ring of claim 1, characterized by comprising structures in which halves of cylindrically-shaped armature core encase the circumference of the armature coil, with the halves of the cylindrically-shaped armature core being slightly larger in radius than that of the armature coil, with the halves of cylindrically-shaped insulator being provided upon the armature coil with a clearance, with a large number of the fan-like electromagnetic material and deformed rectangular thin steel provided thereon, with their shorter sides bent to an arch shape and laminated, with its longer sides orthogonally turned and both ends of inner side of the armature core being circularly made in the shape of a horn aperture, the purpose of this aperture being to ease up reduce the pullback force of the field element ring by the excitation as the field element ring draws out of the armature core, in other words, as the magnetic flux from the field element ring enters or exits the armature core, the armature core is excited and this excitation force is vectorially balanced out and reduced.

4. A generator comprising a structure to generate electricity by the ring geometry action of a field element ring of claim 1 in which the field element ring is stored in a vertically and horizontally stable manner within an armature coil, with adjusting materials, to let the field element ring pass through the circular, cylindrical tube of the armature coil, with such stable storage of the field element ring within the armature coil preventing the filed element ring to rub against the armature coil, from an anteroposterior (front-back directional) amplitude, as the field ring is returning from rotation when phase shifting occurs by variation, or the like, of the hard force rate of the armature coil, or from amplitude of the magnetization and demagnetization of the armature coil.

5. A generator comprising a structure to generate electricity by the ring geometry action of a field element ring of claim 1 in which a reaction by the load force rate of the armature coil is avoided, thereby improving the phase by keeping a certain level of regular impedance by the coil resistance of the armature coil, as well as a synchronous reactance of the armature coil by a parallel-connected capacitor being inserted into a circuit, of appropriate capacity, so as not to influence the drive force capacity of the field element ring and not to fluctuate the generating capacity.

6. A generator comprising a structure to generate electricity by the ring geometry action of a field element ring of claim 1 in which a combination of an armature core set on a base steel sheet and inner-outer roller devices are provided, with the number of the armature cores (or field element) and the inner and outer roller devices being able to be changed, accordingly, thus applying a flexible combination.

7. A generator comprising a structure to generate electricity by the ring geometry action of a field element ring of claim 1 in which a driving mechanism to rotate the field element ring is provided, with the driving mechanism being a structure of driving electric motor, with an armature coil being wound around the field element ring with a slight clearance thereon and an electrical current alternately applied to the armature coil so that magnetic repelling and attracting is repeatedly done according to the polarity of the field element ring or an by electrical current being directly applied to the armature coil.

8. A generator comprising a structure to generate electricity by the ring geometry action of a field element ring of claim 1 in which the field element ring is made as a rotor of the electric motor, and an electrical current is applied to the armature coil.

* * * * *